May 16, 1961 D. D. WEISSMAN 2,984,344
INSTRUMENT CASE
Filed May 5, 1958
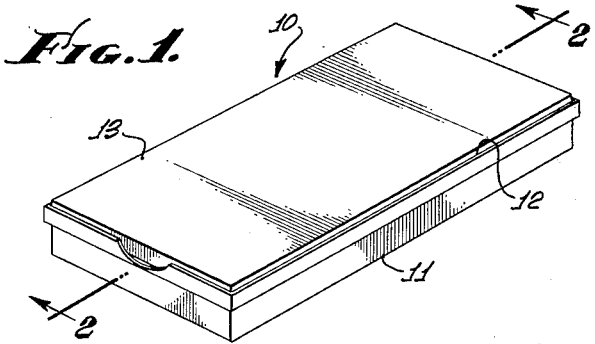
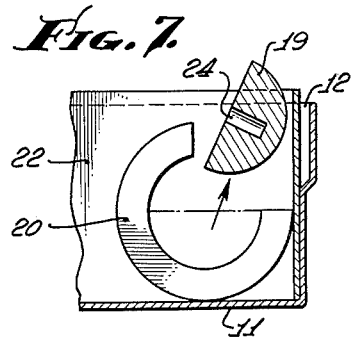
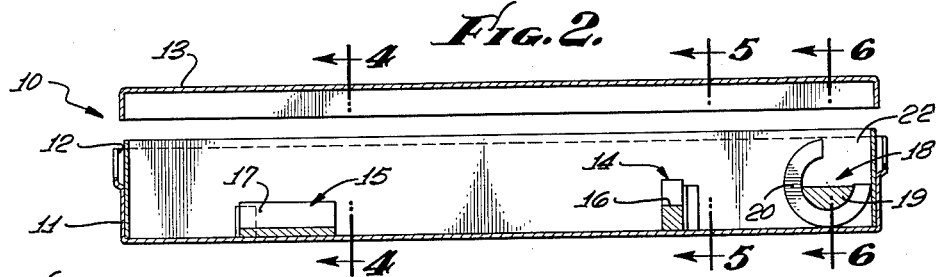
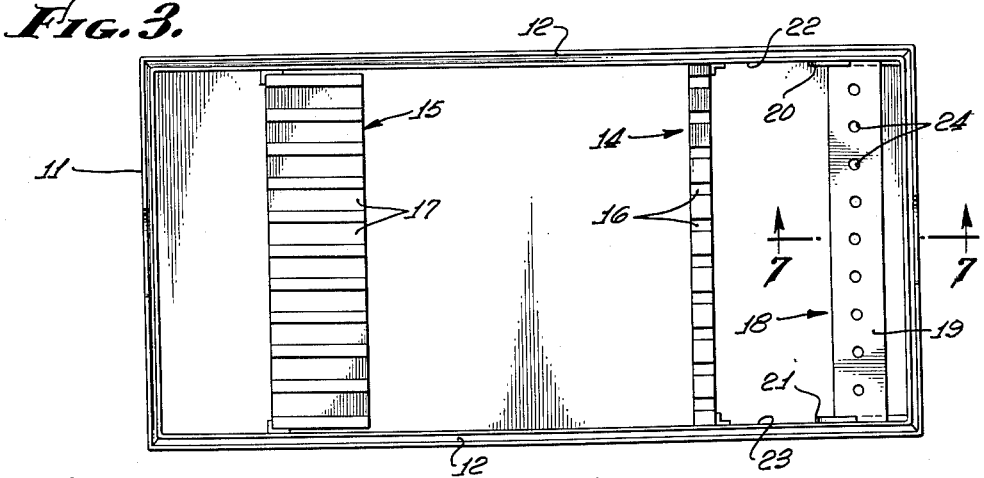
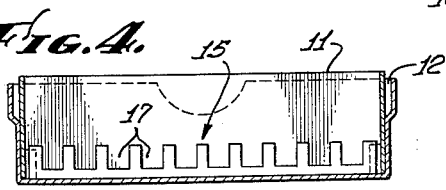
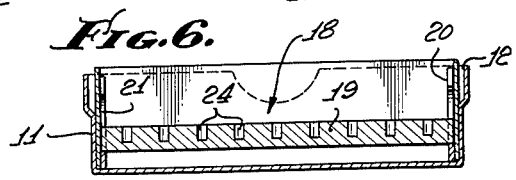
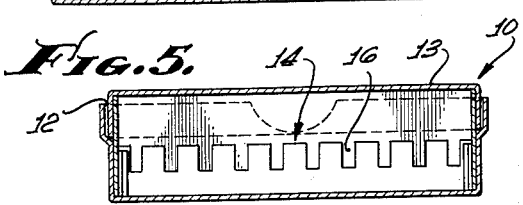
INVENTOR.
DONALD D. WEISSMAN
BY John Joseph Hall
ATTORNEY.

United States Patent Office 2,984,344
Patented May 16, 1961

2,984,344
INSTRUMENT CASE
Donald D. Weissman, 1033 Gayley Ave.,
Los Angeles 24, Calif.
Filed May 5, 1958, Ser. No. 733,113
4 Claims. (Cl. 206—63.5)

This invention relates to improvements in the design of instrument cases, and in particular to an instrument case suitable for dental instruments, as well as for surgical instruments.

The primary object of my invention is to provide a case for dental instruments which can be handled as a unit both for sterilization purposes and then for use in dental operations.

Another object of my invention is to provide a burr block capable of containing several dental burrs which may be easily lifted out of the instrument case as a unit for use in various dental operations, after being sterilized in the instrument case.

A still further object of my invention is to provide an instrument case capable of being stacked in multiples on top of each other and then handled as a single unit for sterilization, and then for use in dental operations.

These and other objects will be more readily understood by reference to the following description and claims, taken in conjunction with the accompanying drawing forming a part hereof, in which Figure 1 is a perspective view of the instrument case with the cover on in the closed position.

Figure 2 is an elevational sectional view taken along line 2—2 of Figure 1 with the cover removed from the instrument case.

Figure 3 is a plan view of the instrument case with the cover removed.

Figure 4 is a cross section taken along line 4—4 of Figure 3.

Figure 5 is a cross section taken along line 5—5 of Figure 3.

Figure 6 is a cross section taken along line 6—6 of Figure 3.

Figure 7 is an enlarged view of a section along line 7—7 of Figure 3 showing the detail of the circular rest for the burr block.

The instrument case 10 is in the shape of an oblong box having a bottom 11 with double side walls separated at the top edges 12 for sealing in conjunction with the cover 13 of the instrument case 10, preparatory to sterilization. Inside the case are front and back instrument rests 14 and 15. The instrument rests contain dividers 16 and 17 for receiving and separating various dental or surgical instruments. Both the front and the back instrument rests may be adjusted forwards or backwards for different lengths of dental or surgical instruments, as the case may be.

At the front portion of the instrument case is a semi-circular rest 18 for the burr block 19. The rest 18 consists of two arms 20 and 21 curved to form an almost complete circle and fixed by welding on the long sides 22 and 23 of the instrument case 10. The arms 20 and 21 are adapted to support the semi-circular burr block which is rotatable while supported by the rest 18 and easily removable from the rest 18.

The burr block 19 contains several narrow holes 24 suitable for receiving dental burrs, hypodermic needles, dental files, or dental reamers, and holding them in place.

In the operation of the device, dental or surgical instruments are placed on the front and back instrument rests 14 and 15. Dental burrs, hypodermic needles, dental files, or dental reamers, are placed in the holes 24 of the burr block 19 while the block is in the up position. The burr block is then rotated a quarter turn approximately toward the rear of the instrument case so that the objects in the holes 24 of the burr block 19 will be horizontal and below the top edges 12 of the double side walls. Then the cover 13 of the instrument case is placed in position in the separations of the top edges 12 of the double side walls. The instrument case is now ready for sterilization.

Upon being sterilized, the instrument case may then be brought to the dental chair or operating table ready for use. After the cover has been removed, the burr block may be lifted out as a unit for positioning closer to the doctor's hands.

For convenience in stacking one case on top of another, indentations may be made in the cover of the case to correspond with protuberances in the bottom of the case. This permits stacking of several cases on top of each other.

The bottom portion of the burr block may be slightly flattened, so that on removal from the burr block rest, the burr block will remain stationary when placed on a flat surface.

While I have described my invention in detail with reference to the accompanying drawing illustrating the preferred form of my invention, it is understood that numerous changes in the details of construction and arrangement of parts may be made without departing from the spirit and scope of the invention as hereinafter claimed.

I claim:
1. A sterilizable instrument case comprising a bottom, double side walls with separated top edges on all sides, a cover fitting into and between the separated top edges of the double side walls and forming a seal for sterilization of the instrument case, instrument rests located movably inside the case, curved arms mounted on each of two opposite interior sides of the instrument case, and a removable block member having blind instrument receiving holes and rotatable towards a side wall of the instrument case while slidably resting on the curved arms.

2. A sterilizable instrument case comprising a bottom, double side walls with separated top edges on all sides, a cover fitting into the separated top edges of the double side walls and forming a seal for sterilization, curved arms mounted on each of two opposite interior sides of the instrument case, and a removable block member slidably resting on the curved arms and having blind holes adapted to receive dental burrs, dental files, dental reamers, and hypodermic needles.

3. A sterilizable instrument case comprising a bottom, double side walls with separated top edges on all sides, a cover fitting into the separated top edges and in contact therewith to form a seal for sterilization of the instrument case, curved arms mounted on each of two opposite interior sides of the instrument case, and a removable block member having blind intsrument receiving holes and rotatable towards a side wall of the instrument case while slidably resting on the curved arms during sterilization of the instrument case.

4. A sterilizable instrument case comprising a bottom, double side walls with separated top edges on all sides, a cover so contsructed and arranged that it can be fitted tightly inbetween said top edges to form a seal for sterilization of the instrument case, curved arms mounted on each of two opposite interior sides of the instrument case, and a removable block member having blind instrument receiving holes and rotatable towards a side wall of the instrument case while slidably resting on the curved arms.

References Cited in the file of this patent

UNITED STATES PATENTS

| | | |
|---|---|---|
| 1,599,652 | Cranston | Sept. 14, 1926 |
| 1,684,417 | Silberman | Sept. 18, 1928 |
| 2,081,930 | Hoffman | June 1, 1937 |
| 2,792,935 | Rocchetti | May 21, 1957 |